(12) United States Patent
Park et al.

(10) Patent No.: US 11,550,503 B2
(45) Date of Patent: Jan. 10, 2023

(54) STORAGE DEVICE WHICH CONTROLS MEMORY ACCORDING TO TEMPERATURE, AND METHOD OF CONTROLLING THE SAME

(71) Applicant: SAMSUNG ELECTRONICS CO., LTD., Suwon-si (KR)

(72) Inventors: Sang-Ryong Park, Hwaseong-si (KR); Soo-Woong Lee, Seoul (KR); Youn-Soo Cheon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 16/899,968

(22) Filed: Jun. 12, 2020

(65) Prior Publication Data

US 2021/0096775 A1    Apr. 1, 2021

(30) Foreign Application Priority Data

Sep. 26, 2019    (KR) .......................... 10-2019-0118738

(51) Int. Cl.
| | |
|---|---|
| *G06F 3/06* | (2006.01) |
| *G01K 13/00* | (2021.01) |
| *G06F 9/4401* | (2018.01) |
| *G01K 3/00* | (2006.01) |

(52) U.S. Cl.
CPC .......... *G06F 3/0659* (2013.01); *G01K 3/005* (2013.01); *G01K 13/00* (2013.01); *G06F 3/0604* (2013.01); *G06F 3/0653* (2013.01); *G06F 3/0679* (2013.01); *G06F 9/4401* (2013.01)

(58) Field of Classification Search
CPC .... G06F 3/0659; G06F 3/0604; G06F 3/0653; G06F 3/0679; G06F 9/4401; G06F 3/0616; G01K 3/005; G01K 13/00; G01K 1/14; G01K 1/026; G11C 16/30; G11C 7/04

See application file for complete search history.

(56) References Cited

U.S. PATENT DOCUMENTS

| | | | |
|---|---|---|---|
| 7,569,904 B2 | 8/2009 | Oh et al. | |
| 7,590,473 B2 | 9/2009 | Wyatt | |
| 9,257,167 B2 * | 2/2016 | Fujita | .................. G11C 11/1673 |
| 9,489,146 B2 | 11/2016 | Erez | |
| 10,013,194 B1 * | 7/2018 | Yang | ..................... G06F 3/0652 |
| 10,339,983 B1 * | 7/2019 | Confalonieri | ...... G11C 13/0033 |
| 2004/0199730 A1 | 10/2004 | Eggers | |
| 2007/0213882 A1 | 9/2007 | Inukai et al. | |

(Continued)

FOREIGN PATENT DOCUMENTS

KR    1020180110574    10/2018

*Primary Examiner* — Eric T Oberly
(74) *Attorney, Agent, or Firm* — F. Chau & Associates, LLC

(57) ABSTRACT

A storage device includes a memory and a memory controller which transmits a command to the memory. The memory includes at least one memory cell array, a memory temperature sensor which measures a temperature of the memory, and a control logic. The control logic outputs a busy signal in response to the command, receives the temperature of the memory from the memory temperature sensor in response to the command, and determines whether to perform a command operation according to the command on the memory cell array based on the received temperature of the memory.

20 Claims, 12 Drawing Sheets

(56) References Cited

U.S. PATENT DOCUMENTS

| | | | | |
|---|---|---|---|---|
| 2013/0290600 A1* | 10/2013 | Tzafrir | ............... | G06F 11/004 |
| | | | | 711/103 |
| 2016/0078907 A1* | 3/2016 | Woo | ............... | G11C 11/40626 |
| | | | | 711/162 |
| 2017/0071056 A1* | 3/2017 | Stoev | ............... | G11B 5/09 |
| 2017/0344309 A1* | 11/2017 | Balakrishnan | ....... | G06F 3/0673 |
| 2018/0293029 A1* | 10/2018 | Achtenberg | ....... | G06F 11/1068 |
| 2019/0050147 A1* | 2/2019 | Koo | ............... | G06F 3/0653 |
| 2019/0171259 A1* | 6/2019 | McFarland | ........... | G06F 1/206 |
| 2019/0339881 A1* | 11/2019 | Scott, III | ............. | G06F 1/206 |
| 2020/0142635 A1* | 5/2020 | Nguyen | ............ | G06F 3/0604 |

\* cited by examiner

STORAGE DEVICE WHICH CONTROLS MEMORY ACCORDING TO TEMPERATURE, AND METHOD OF CONTROLLING THE SAME

CROSS-REFERENCE TO RELATED APPLICATIONS

This application claims priority under 35 U.S.C. § 119 to Korean Patent Application No. 10-2019-0118738, filed on Sep. 26, 2019 in the Korean Intellectual Property Office, the disclosure of which is incorporated by reference herein in its entirety.

TECHNICAL FIELD

Exemplary embodiments of the present disclosure relate to a storage device and a method of controlling the same.

DISCUSSION OF RELATED ART

As a non-volatile memory, a flash memory can retain stored data even when the power supply is interrupted. Recently, storage devices including flash memories such as embedded multimedia cards (eMMCs), universal flash storage (UFS), solid state drives (SSDs), and memory cards have become more widely used. Storage devices are used to store or move large amounts of data.

When the temperature of a memory in a storage device increases, the storage device operates while consuming a large amount of power. Therefore, the operating performance of the storage device may be reduced. Otherwise, the memory may be damaged, thus causing an error in data stored in the storage device and/or shortening the life of the storage device.

SUMMARY

Aspects of the present disclosure provide a storage device which controls a memory according to the temperature of the memory without intervention of a memory controller.

Aspects of the present disclosure also provide a method of controlling a storage device which controls a memory according to the temperature of the memory without intervention of a memory controller.

According to an exemplary embodiment of the present disclosure, a storage device includes a memory and a memory controller. The memory controller transmits a command to the memory. The memory includes at least one memory cell array, a memory temperature sensor which measures a temperature of the memory, and a control logic. The control logic outputs a busy signal in response to the command, receives the temperature of the memory from the memory temperature sensor in response to the command, and determines whether to perform a command operation according to the command on the memory cell array based on the received temperature of the memory.

According to an exemplary embodiment of the present disclosure, a storage device includes a storage device temperature sensor which measures a temperature of the storage device, a memory controller which receives the temperature of the storage device from the storage device temperature sensor and generates an enable signal when the received temperature of the storage device is higher than or equal to a first set temperature, and first and second memories. Each of the first and second memories operates in a thermal throttling mode in response to the enable signal received from the memory controller. The first memory, while operating in the thermal throttling mode, receives a temperature of the first memory from a first memory temperature sensor disposed in the first memory in response to a first command received from the memory controller and determines whether to perform the first command according to the received temperature of the first memory. The second memory, while operating in the thermal throttling mode, receives a temperature of the second memory from a second memory temperature sensor disposed in the second memory in response to a second command received from the memory controller and determines whether to perform the second command according to the received temperature of the second memory. A time when the first command is performed by the first memory is different from a time when the second command is performed by the second memory.

According to an exemplary embodiment of the present disclosure, a method of controlling a storage device includes measuring a temperature of the storage device using a storage device temperature sensor disposed in the storage device, generating an enable signal when the temperature of the storage device is higher than a first set temperature, measuring a temperature of the memory using a memory temperature sensor disposed in the memory in response to a command while the enable signal is provided, and determining whether to perform a command operation according to the command on the memory based on the measured temperature of the memory.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION

Figure 1:
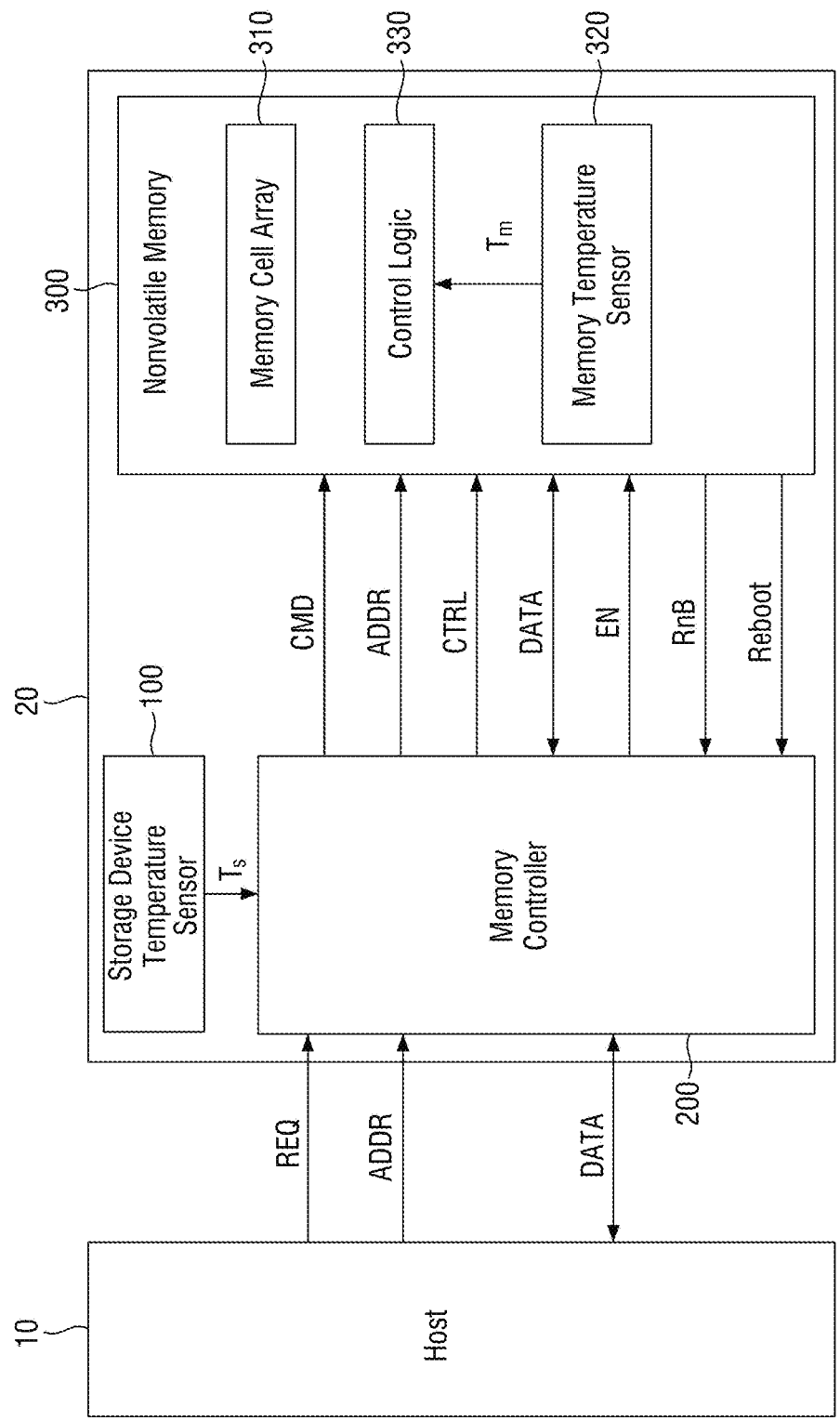
FIG. 1 is a block diagram of a system including a storage device according to exemplary embodiments.

Exemplary embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

FIG. 1 is a block diagram of a system including a storage device 20 according to exemplary embodiments.

Referring to FIG. 1, the system including the storage device 20 according to exemplary embodiments may include a host 10 and the storage device 20. The system may be, but is not limited to, a data storage medium based on a flash memory such as a memory card, a universal serial bus (USB) memory, a solid state drive (SSD), etc.

The host 10 may transmit a data operation request REQ and an address ADDR to a memory controller 200 and exchange data DATA with the memory controller 200.

The storage device 20 may include a storage device temperature sensor 100, the memory controller 200, and a memory 300. The memory 300 may be, for example, a nonvolatile memory.

The storage device temperature sensor 100 may be disposed inside the storage device 20. The storage device temperature sensor 100 may measure a temperature Ts of the storage device 20.

The memory controller 200 may receive the temperature $T_s$ of the storage device 20 from the storage device temperature sensor 100. The memory controller 200 may provide an enable signal EN to the memory 300 according to the temperature $T_s$ of the storage device 20 received from the storage device temperature sensor 100.

The memory controller 200 may control the memory 300 in response to a request from the host 10. The memory controller 200 may, for example, read data DATA stored in the memory 300 in response to the data operation request REQ received from the host 10, and may control the memory 300 to write data DATA. The memory controller 200 may provide the address ADDR, a command CMD, and a control signal CTRL to the memory 300, and control program, read and erase operations of the memory 300. In addition, data DATA to be programmed and data DATA read out may be transmitted and received between the memory controller 200 and the memory 300.

The memory 300 may output a ready and busy signal RnB. The ready and busy signal RnB may indicate the state of the memory 300. When the memory 300 outputs, for example, a ready signal, the memory controller 200 may provide the command CMD to the memory 300. In an exemplary embodiment, when the memory 300 outputs, for example, a busy signal, the memory controller 200 does not provide the command CMD. The memory 300 may include a memory cell array 310, a memory temperature sensor 320, and a control logic 330. The memory 300 may be rebooted depending on a temperature $T_m$ of the memory 300 measured by a memory temperature sensor 320 to be described later. When the memory 300 is rebooted, it may output a reboot signal Reboot in response to the command CMD received from the memory controller 200.

Figure 2:
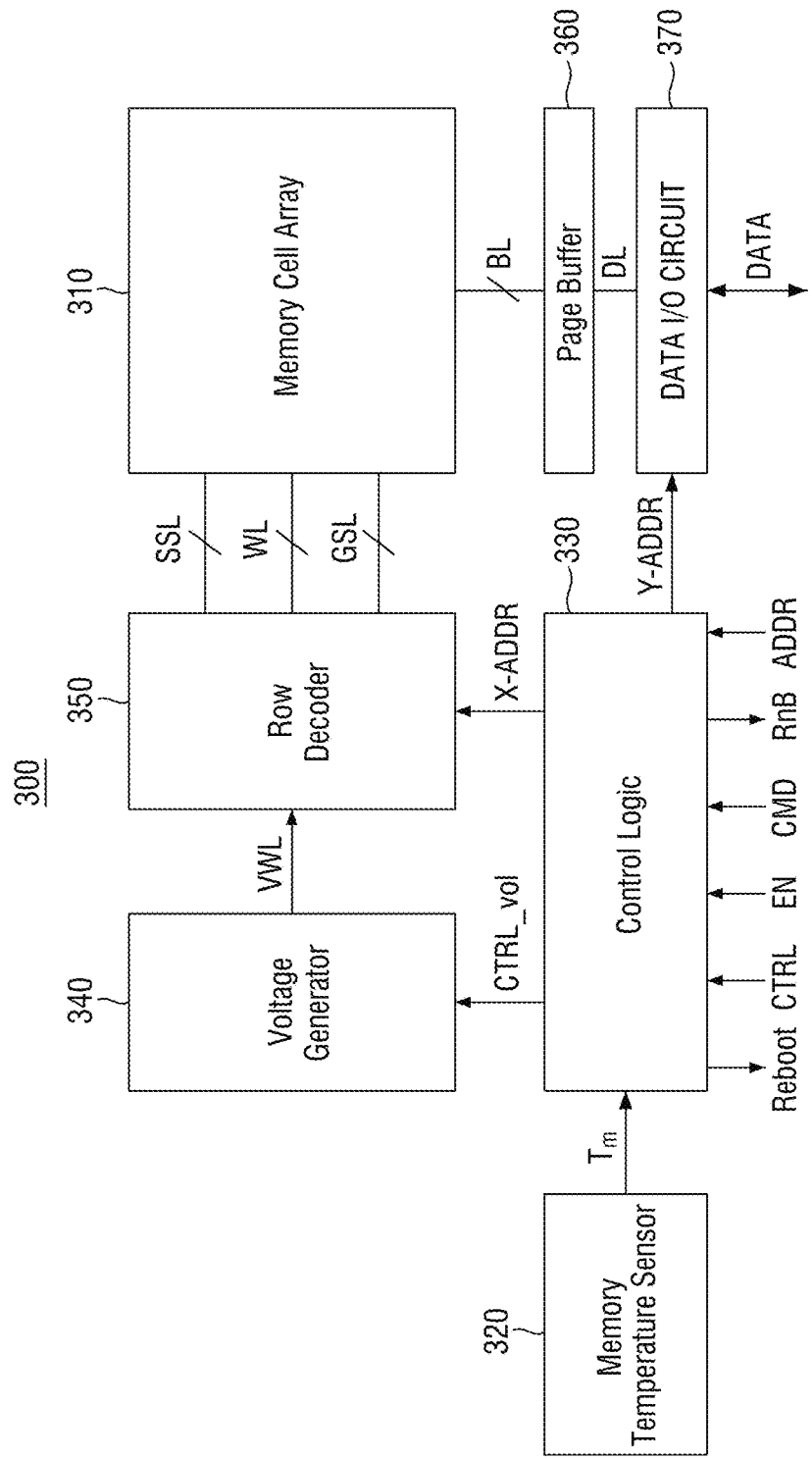
FIG. 2 is an exemplary block diagram of a memory of FIG. 1.

FIG. 2 is an exemplary block diagram of the memory 300 of FIG. 1.

Referring to FIGS. 1 and 2, the memory 300 may include the memory cell array 310, the memory temperature sensor 320, and the control logic 330.

The memory 300 may be, but is not limited to, a NAND flash memory, a vertical NAND flash memory (VNAND), a NOR flash memory, a resistive random access memory (RRAM), a phase change RAM (PRAM), a magnetoresistive RAM (MRAM), a ferroelectric RAM (FRAM), or a spin-transfer torque magnetic RAM (STT-RAM).

The memory cell array 310 may include a plurality of memory blocks, and each of the memory blocks may include a plurality of memory cells connected to a plurality of word lines WL and a plurality of bit lines BL.

The memory cell array 310 may be connected to a row decoder 350 through a plurality of string select lines SSL, a plurality of word lines WL, and a plurality of ground select lines GSL. In addition, the memory cell array 310 may be connected to a page buffer circuit 360 through a plurality of bit lines BL.

The memory temperature sensor 320 may be disposed inside the memory 300. The memory temperature sensor 320 may measure the temperature $T_m$ of the memory 300. The temperature $T_m$ of the memory 300 measured by the memory temperature sensor 320 may be provided to the control logic 330.

The memory 300 may operate in a thermal throttling mode in response to the enable signal EN. In the thermal throttling mode, the control logic 330 may receive the temperature Tm of the memory 300 from the memory temperature sensor 320 in response to the command CMD. In the thermal throttling mode, when the control logic 330 finishes performing an operation on the memory cell array 310 according to the command CMD, it may receive the temperature Tm of the memory 300 from the memory temperature sensor 320. This will be described further below with reference to FIGS. 3 through 8.

The control logic 330 may control the overall operation of the memory 300 based on the command CMD, the address ADDR, the control signal CTRL and the enable signal EN received from the memory controller 200. The control logic 330 may control, for example, a write operation, a read operation and an erase operation of the memory 300. The control logic 330 may output the ready and busy signal RnB indicating the state of the memory 300.

The control logic 330 may provide a voltage control signal CTRL_vol to a voltage generator 340. The control logic 330 may generate a row address X-ADDR and a column address Y-ADDR based on the address signal ADDR. The control logic 330 may provide the row address X-ADDR to the row decoder 350 and provide the column address Y-ADDR to a data input/output (I/O) circuit 370.

The voltage generator 340 may generate operating voltages necessary for the operation of the memory 300 in response to the voltage control signal CTRL_vol. The operating voltages may include, but are not limited to, a word line voltage VWL, a program voltage, a read voltage, a verify voltage, and an erase voltage.

The row decoder 350 may be connected to the memory cell array 310 through the string select lines SSL, the word lines WL, and the ground select lines GSL. The row decoder 350 may select a string select line SSL, a word line WL and a ground select line GSL in response to the row address X-ADDR. The row decoder 350 may apply the operating voltages received from the voltage generator 340 to selected and unselected string select lines SSL, word lines WL and ground select lines GSL, respectively.

The page buffer circuit 360 may be connected to the memory cell array 310 through the bit lines BL. The page buffer circuit 360 may include a plurality of page buffers. The page buffer circuit 360 may temporarily store data to be written to a selected page during a write operation. The page buffer circuit 360 may temporarily store data read from a selected page during a read operation.

The data I/O circuit 370 may be connected to the page buffer circuit 360 through data lines DL. For example, during a write operation, the data I/O circuit 370 may receive write data DATA from the memory controller 200 and provide the write data DATA to the page buffer circuit 360 based on the column address Y-ADDR received from the control logic 330. For example, during a read operation, the data I/O circuit 370 may provide read data DATA stored in the page buffer circuit 360 to the memory controller 200 based on the column address Y-ADDR received from the control logic 330.

Figure 3:
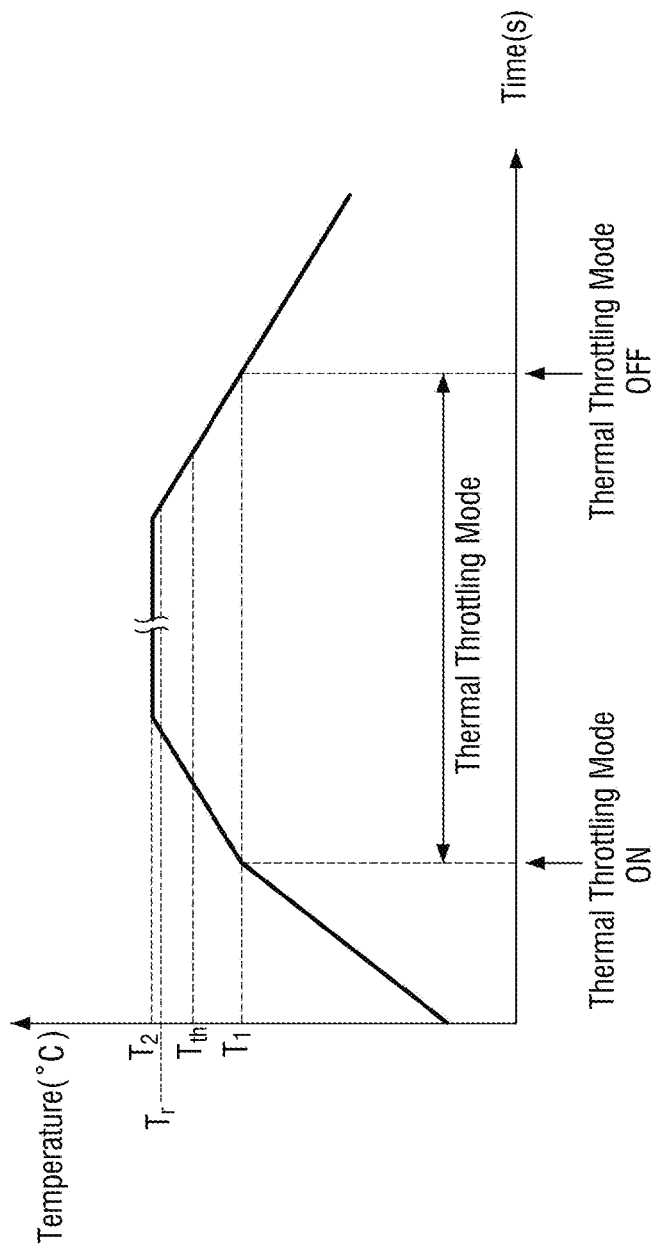
FIG. 3 is a graph illustrating a thermal throttling mode of a storage device according to exemplary embodiments.

FIG. 3 is a graph illustrating the thermal throttling mode of the storage device 20 according to exemplary embodiments. The X axis represents time, and the Y axis represents the temperature of the memory 300 or the temperature of the storage device 20.

Referring to FIG. 3, a first set temperature $T_1$, a throttling temperature $T_{th}$, a second set temperature $T_2$, and a reboot temperature $T_r$ may be different from each other. The throttling temperature $T_{th}$ may be higher than the first set temperature $T_1$ and lower than the second set temperature $T_2$. The reboot temperature $T_r$ may be higher than the throttling temperature $T_{th}$ and lower than the second set temperature $T_2$. The first set temperature $T_1$, the throttling temperature $T_{th}$, the second set temperature $T_2$, and the reboot temperature $T_r$ may be preset values and may be set differently for different storage devices. The storage device 20 may operate in the thermal throttling mode when its temperature is higher than or equal to the first set temperature $T_1$ and lower than the second set temperature $T_2$. When the temperature of the storage device 20 is higher than or equal to the first set temperature $T_1$, the thermal throttling mode of the storage device 20 may be turned on. The storage device 20 according to an exemplary embodiment may perform a command operation by comparing the temperature $T_m$ of the memory 300 and the throttling temperature $T_{th}$ in the thermal throttling mode. The storage device 20 may perform the command operation when the temperature $T_m$ of the memory 300 is lower than or equal to the throttling temperature $T_{th}$.

Alternatively, the storage device 20 according to an exemplary embodiment may perform a command operation by comparing the temperature $T_m$ of the memory 300, the throttling temperature $T_{th}$, and the reboot temperature $T_r$ in the thermal throttling mode. When the temperature $T_m$ of the memory 300 is lower than or equal to the throttling temperature $T_{th}$ and lower than the reboot temperature $T_r$, the storage device 20 may perform the command operation.

When the temperature $T_m$ of the memory 300 is higher than or equal to the reboot temperature $T_r$, the storage device 20 may be rebooted to protect itself.

In addition, in an exemplary embodiment, when the temperature of the storage device 20 is higher than or equal to the second set temperature $T_2$, the storage device 20 does not generate a command to protect itself.

When the temperature of the storage device 20 is lower than the first set temperature $T_1$, the thermal throttling mode of the storage device 20 may be turned off. This is because the temperature of the storage device 20 is low enough for the storage device 20 to perform a command operation. Therefore, in an exemplary embodiment, while not operating in the thermal throttling mode, the storage device 20 does not receive the temperature of the memory 300 from the memory temperature sensor 320. That is, the storage device 20 may perform a command operation regardless of the temperature of the memory 300. Therefore, a sensing operation of the memory temperature sensor 320 may be stopped, thereby reducing the amount of heat generated and the power consumed by the storage device 20.

Figure 4:
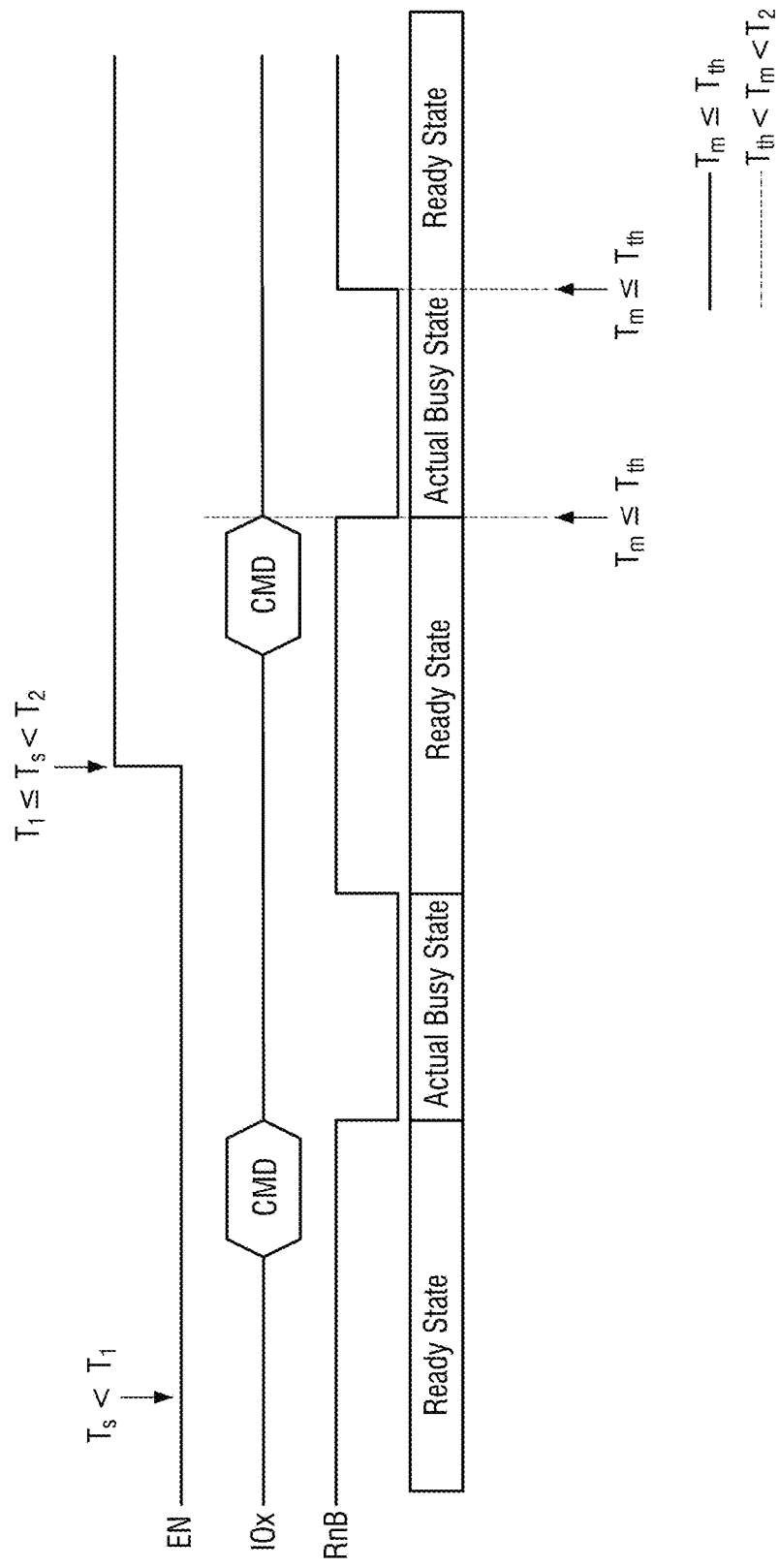
FIG. 4 illustrates the operation of a storage device according to exemplary embodiments.
Figure 5:
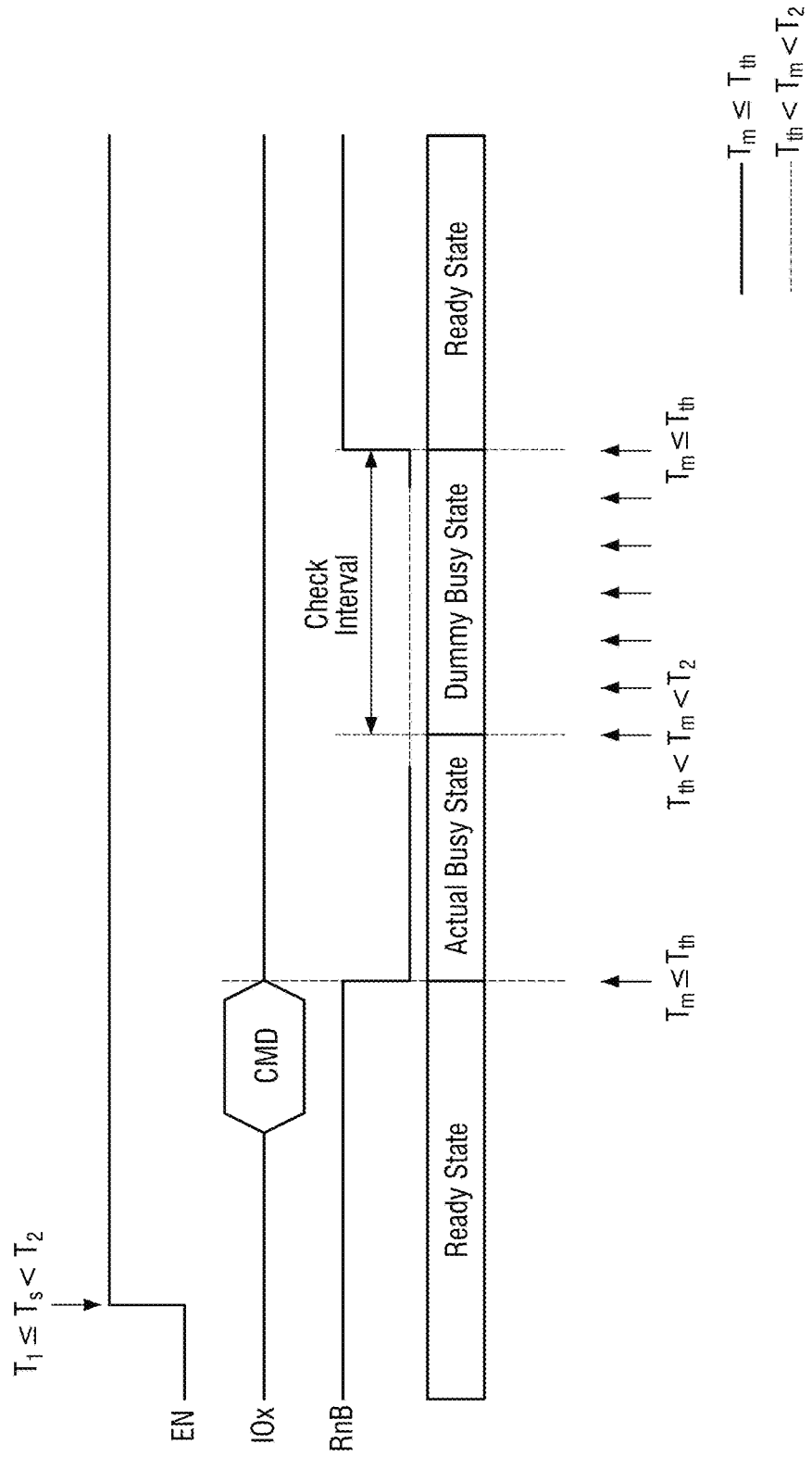
FIG. 5 illustrates the operation of a storage device according to exemplary embodiments.
Figure 6:
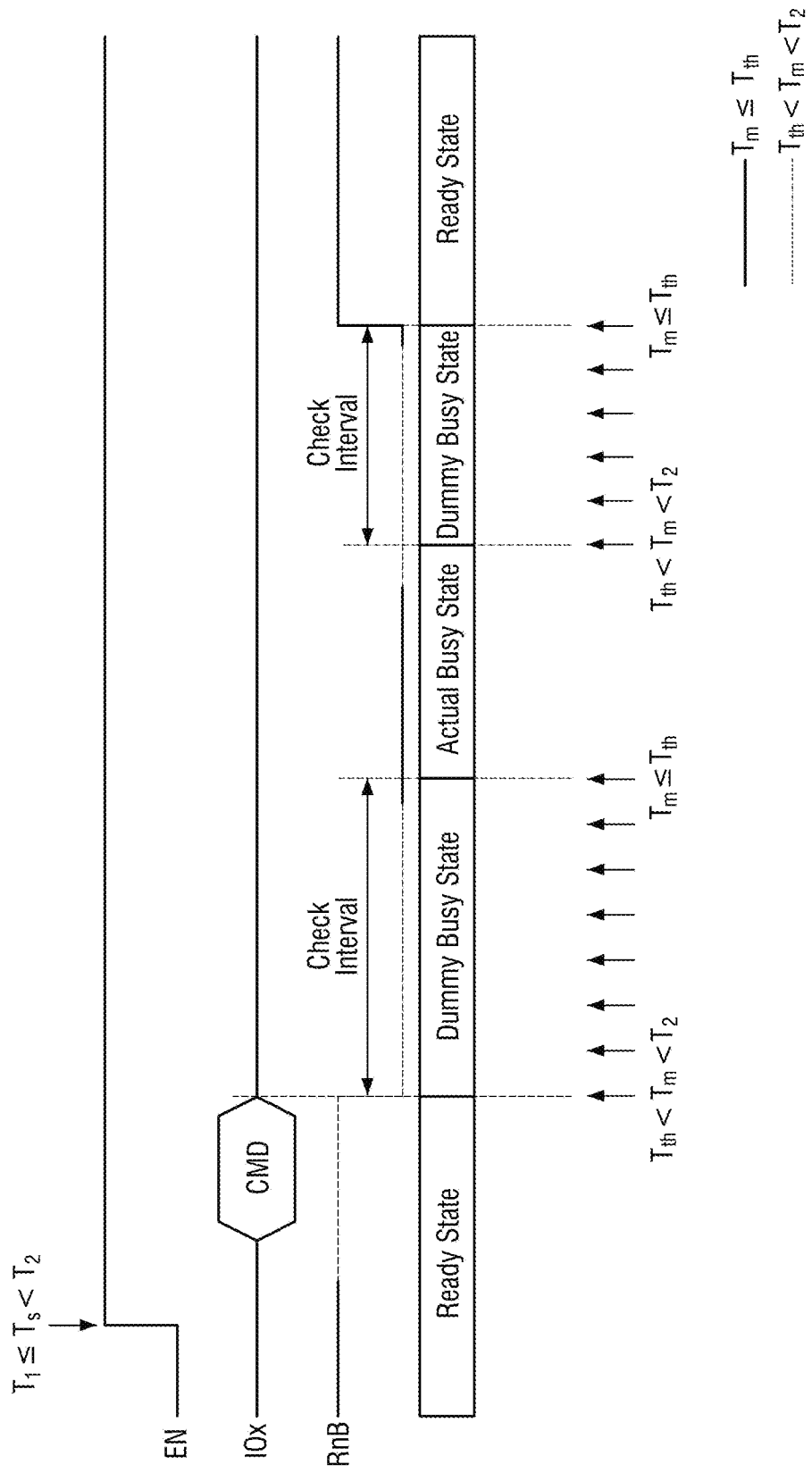
FIG. 6 illustrates the operation of a storage device according to exemplary embodiments.

FIGS. 4 through 6 illustrate the operation of the storage device 20 according to exemplary embodiments. In FIGS. 4 through 6, a solid ready and busy signal line RnB indicates a case in which the temperature $T_m$ of the memory 300 is lower than or equal to the throttling temperature $T_{th}$, and a dotted ready and busy signal line RnB indicates a case in which the temperature $T_m$ of the memory 300 is higher than the throttling temperature $T_{th}$ and lower than the second set temperature $T_2$.

Referring to FIGS. 1, 3 and 4, the memory 300 may receive the command CMD from the memory controller 200 through an I/O line I/Ox. The memory 300 may perform a command operation according to the command CMD in response to the command CMD. The memory 300 may output a busy signal at a low level while performing the command operation. Although the memory 300 outputs the busy signal at a time when the command CMD is provided to the memory 300 in FIG. 4, exemplary embodiments are not limited to this case. For example, the memory 300 may also output the busy signal at a predetermined time after the command CMD is received.

Next, the memory 300 may output a ready signal at a high level after finishing the command operation.

When the temperature $T_s$ of the storage device 20 is higher than or equal to the first set temperature $T_1$ and lower than the second set temperature $T_2$, the memory controller 200 may output the enable signal EN at a high level. While the enable signal EN at the high level is output, the memory 300 may operate in the thermal throttling mode.

In the thermal throttling mode, the memory 300 may determine whether the temperature $T_m$ of the memory 300 is lower than or equal to the throttling temperature $T_{th}$ in response to the command CMD. When the temperature $T_m$ of the memory 300 is lower than or equal to the throttling temperature $T_{th}$, the memory 300 may perform a command operation. The memory 300 may output a busy signal at a low level while performing the command operation. Whether the temperature $T_m$ of the memory 300 is lower than or equal to the throttling temperature $T_{th}$ is determined at a time when the command CMD is provided to the memory 300. However, exemplary embodiments are not limited to this case. For example, the memory 300 may determine whether the temperature $T_m$ of the memory 300 is lower than or equal to the throttling temperature $T_{th}$ when starting to perform the command operation.

When the memory 300 finishes the command operation, it may be determined whether the temperature $T_m$ of the memory 300 is lower than or equal to the throttling temperature $T_{th}$. The memory 300 may output a ready signal when determining that the temperature $T_m$ of the memory 300 is lower than or equal to the throttling temperature $T_{th}$. That is, the memory 300 may determine whether the temperature $T_m$ of the memory 300 is lower than or equal to the throttling temperature $T_{th}$ when starting the command operation and when finishing the command operation.

Herein, when it is described that the memory 300 outputs a busy signal, it may mean that the ready and busy signal RnB is at a low level, and when it is described that the memory 300 outputs a ready signal, it may mean that the ready and busy signal RnB is at a high level.

Referring to FIGS. 1 and 5, while the memory 300 performs the command operation (actual busy state), the temperature $T_m$ of the memory 300 may increase. When the temperature $T_m$ of the memory 300 is higher than the throttling temperature $T_{th}$ after the memory 300 finishes the command operation, the memory 300 may output a busy signal at a low level (e.g., the ready and busy signal RnB may be at a low level). That is, the memory 300 may be in a dummy busy state in which it outputs a busy signal but does not actually perform a command operation. Therefore, the temperature $T_m$ of the memory 300 may decrease.

In the dummy busy state, the memory 300 may determine whether the temperature $T_m$ of the memory 300 is lower than or equal to the throttling temperature $T_{th}$ at regular intervals. The memory 300 may output a ready signal at a high level when determining that the temperature $T_m$ of the memory 300 is lower than or equal to the throttling temperature $T_{th}$.

Referring to FIGS. 1 through 6, the temperature $T_m$ of the memory 300 before the command CMD is received may be higher than the throttling temperature $T_{th}$. In this case, in an exemplary embodiment, the memory 300 may output a busy signal in response to the command CMD but does not actually perform a command operation. That is, the memory 300 may be in the dummy busy state.

In the dummy busy state, the memory 300 may determine whether the temperature $T_m$ of the memory 300 is lower than or equal to the throttling temperature $T_{th}$ at regular intervals. When determining that the temperature $T_m$ of the memory 300 is lower than or equal to the throttling temperature $T_{th}$, the memory 300 may perform a command operation. That is, the memory 300 may be in the actual busy state in which it outputs a busy signal and actually performs a command operation.

When the temperature $T_m$ of the memory 300 is higher than the throttling temperature $T_{th}$ after the memory 300 finishes the command operation, the memory 300 may output a busy signal at a low level (e.g., the ready and busy signal RnB may be at a low level) as described above.

Figure 7:
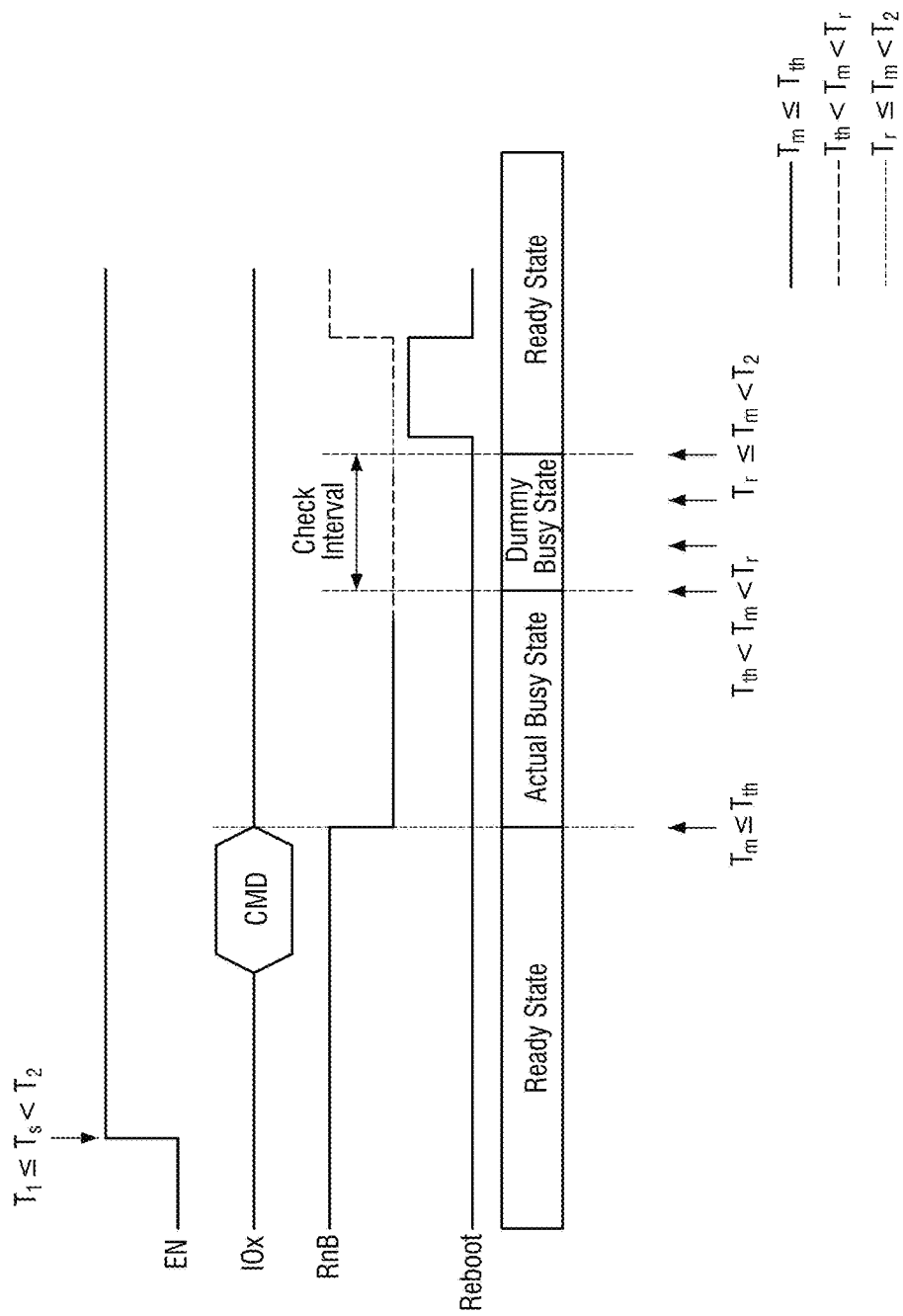
FIG. 7 illustrates the operation of a storage device according to exemplary embodiments.

FIG. 7 illustrates the operation of a storage device 20 according to exemplary embodiments.

In FIG. 7, a solid ready and busy signal line RnB indicates a case in which a temperature $T_m$ of a memory 300 is lower than or equal to a throttling temperature $T_{th}$, a broken ready and busy signal line RnB indicates a case in which the temperature $T_m$ of the memory 300 is higher than the throttling temperature $T_{th}$ and lower than a reboot temperature $T_r$, and a dotted ready and busy signal line RnB, which is smaller than the broken ready and busy signal line RnB, indicates a case in which the temperature $T_m$ of the memory 300 is higher than or equal to the reboot temperature $T_r$ and lower than a second temperature $T_2$. The following description will focus on differences from the embodiments of FIGS. 4 through 6 described above.

Referring to FIGS. 1, 3 and 7, a memory controller 200 may output an enable signal EN at a high level when a temperature $T_s$ of the storage device 20 is higher than or equal to a first set temperature $T_1$ and lower than the second set temperature $T_2$. The memory 300 may operate in a thermal throttling mode while the enable signal EN at the high level is output.

In the thermal throttling mode, the temperature $T_m$ of the memory 300 may increase while the memory 300 performs a command operation (actual busy state). When the temperature $T_m$ of the memory 300 is higher than the reboot temperature $T_r$ after the memory 300 finishes the command operation, the memory 300 may be rebooted to protect itself. The rebooted memory 300 may output a reboot signal Reboot. That is, the memory 300 may output the reboot signal Reboot in response to a command CMD.

The storage device 20 according to exemplary embodiments may be controlled according to the temperature $T_s$ of the storage device 20, and the memory 300 may be individually rebooted when the temperature $T_m$ of the memory 300 is higher than or equal to the reboot temperature $T_r$. Therefore, damage due to the temperature $T_m$ of the memory 300 can be prevented, thereby protecting the memory 300 and the storage device 20.

Figure 8:
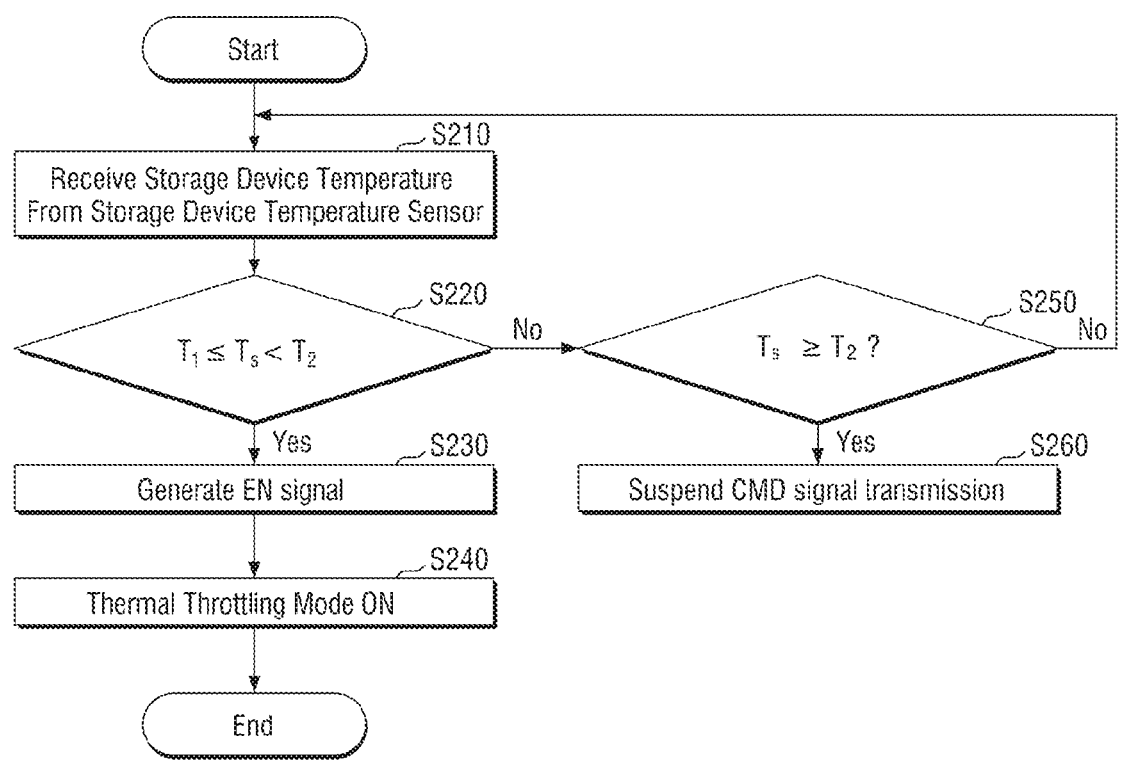
FIG. 8 is a flowchart illustrating the operation of a storage device in a thermal throttling mode according to exemplary embodiments.

FIG. 8 is a flowchart illustrating the operation of the storage device 20 in the thermal throttling mode according to exemplary embodiments.

Referring to FIGS. 1 and 8, the memory controller 200 according to exemplary embodiments may receive the temperature $T_s$ of the storage device 20 from the storage device temperature sensor 100 at regular intervals (operation S210).

The memory controller 200 may determine whether the temperature $T_s$ of the storage device 20 is higher than or equal to the first set temperature $T_1$ and lower than the second set temperature $T_2$ (operation S220).

Then, the memory controller 200 may generate the enable signal EN when determining that the temperature $T_s$ of the storage device 20 is higher than or equal to the first set temperature $T_1$ and lower than the second set temperature $T_2$ (operation S230). The memory controller 200 may provide the enable signal EN to the memory 300.

Herein, when the enable signal EN is described as being generated/provided, it may mean that the enable signal EN is activated, for example, is transitioned from a low level to a high level.

The memory 300 may execute a thermal throttling mode in response to the enable signal EN (operation S240). That is, the memory 300 may execute the thermal throttling mode while the enable signal EN is provided (e.g., is at a high level). The thermal throttling mode may be a mode in which the memory 300 determines whether to perform a command operation based on a temperature $T_m$ of the memory 300.

When the memory controller 200 determines in operation S220 that the temperature $T_s$ of the storage device 20 is not higher than or equal to the first set temperature $T_1$ and lower than the second set temperature $T_2$, the memory controller 200 may determine whether the temperature $T_s$ of the storage device 20 is higher than or equal to the second set temperature $T_2$ (operation S250).

Then, when determining that the temperature $T_s$ of the storage device 20 is higher than or equal to the second set temperature $T_2$, the memory controller 200 may stop transmitting a command CMD to the memory 300 (operation S260). The second set temperature $T_2$ may be, for example, a temperature at which the storage device 20 can operate normally. To protect the storage device 20, the memory controller 200 may stop transmitting the command CMD when determining that the temperature $T_s$ of the storage device 20 is higher than or equal to the second set temperature $T_2$.

When determining in operation S250 that the temperature $T_s$ of the storage device 20 is lower than the second set temperature $T_2$, the memory controller 200 may return to operation S210 and receive the temperature $T_s$ of the storage device 20 from the storage device temperature sensor 100. This is because the storage device 20 is protected even without execution of the thermal throttling mode when the temperature $T_s$ of the storage device 20 is lower than the first set temperature $T_1$. Therefore, the memory controller 200 may perform a command operation in response to the command CMD without receiving the temperature $T_s$ of the storage device 20 from the storage device temperature sensor 100. The thermal throttling mode will now be described with reference to FIG. 9.

Figure 9:
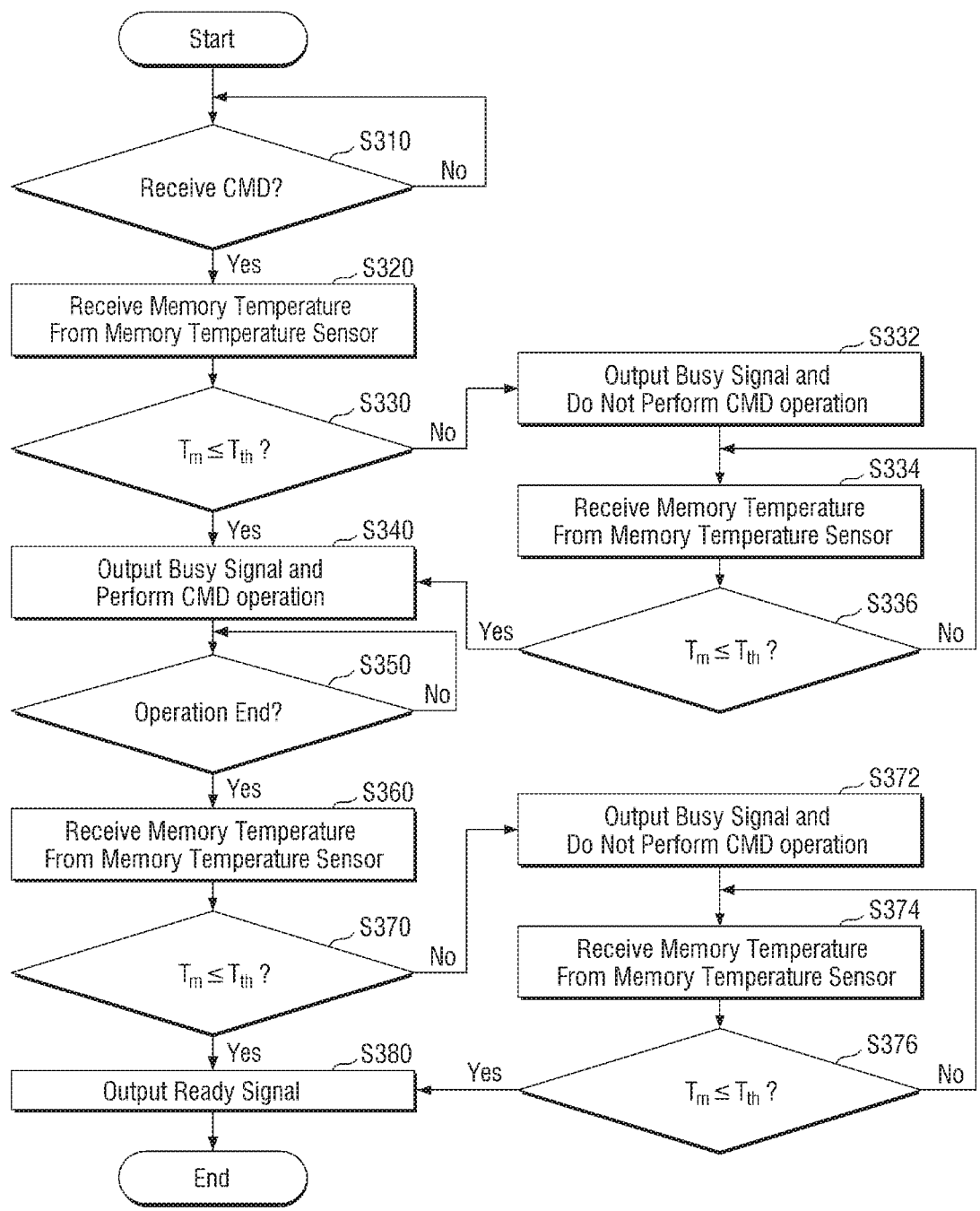
FIG. 9 is a flowchart illustrating the operation of a storage device in a thermal throttling mode according to exemplary embodiments.

FIG. 9 is a flowchart illustrating the operation of the storage device 20 in the thermal throttling mode according to exemplary embodiments.

Referring to FIGS. 1 and 9, when the control logic 330 receives a command CMD from the memory controller 200 in the thermal throttling mode (operation S310), the control logic 330 may receive the temperature $T_m$ of the memory 300 from the memory temperature sensor 320 (operation S320).

Alternatively, in operation S310, when the control logic 330 does not receive the command CMD from the memory controller 200 in the thermal throttling mode, the control logic 330 does not receive the temperature $T_m$ of the memory 300 from the memory temperature sensor 320.

Therefore, since the storage device 20 according to exemplary embodiments receives the temperature $T_m$ of the memory 300 from the memory temperature sensor 320 in response to the command CMD in the thermal throttling mode, the power consumed by the memory controller 200 to receive the temperature $T_m$ of the memory 300 from the memory temperature sensor 320 can be reduced.

The control logic 330 may determine whether the temperature $T_m$ of the memory 300 is lower than or equal to the throttling temperature $T_{th}$ (operation S330). The throttling temperature $T_{th}$ may be set differently, for example, for different storage devices, and may be a preset temperature.

When determining that the temperature $T_m$ of the memory 300 is lower than or equal to the throttling temperature $T_{th}$, the control logic 330 may output a busy signal (e.g., may set the ready and busy signal RnB to a low level) and perform a command operation according to the command CMD (operation S340).

Then, the control logic 330 may determine whether the command operation according to the command CMD has been finished (operation S350).

When determining that the command operation according to the command CMD has finished, the control logic 330 may receive the temperature $T_m$ of the memory 300 from the memory temperature sensor 320 (operation S360).

Then, the control logic 330 may determine whether then temperature $T_m$ of the memory 300 is lower than or equal to the throttling temperature $T_{th}$ (operation S370).

When determining that the temperature $T_m$ of the memory 300 is lower than or equal to the throttling temperature $T_{th}$, the control logic 330 may output a ready signal (operation S380) (e.g., may set the ready and busy signal RnB to a high level).

When determining in operation S330 that the temperature $T_m$ of the memory 300 is higher than the throttling temperature $T_{th}$, the control logic 330 may output a busy signal (e.g., may set the ready and busy signal RnB to a low level) and does not perform the command operation according to the command CMD (operation S332). Therefore, the amount of heat generated or the power consumed by the storage device 20 can be reduced.

Then, the control logic 330 may receive the temperature $T_m$ of the memory 300 from the memory temperature sensor 320 at regular intervals (operation S334). The regular intervals may be set differently, for example, for different storage devices and may be preset intervals.

Then, the control logic 330 may determine whether the temperature $T_m$ of the memory 300 is lower than or equal to the throttling temperature $T_{th}$ (operation S336).

When determining that the temperature $T_m$ of the memory 300 is lower than or equal to the throttling temperature $T_{th}$, the control logic 330 may output a busy signal (e.g., may set the ready and busy signal RnB to a low level) and perform the command operation according to the command CMD (operation S340).

Alternatively, when determining in operation S336 that the temperature $T_m$ of the memory 300 is higher than the throttling temperature $T_{th}$, the control logic 330 may return to operation S334 and measure the temperature $T_m$ of the memory 300 at the regular intervals.

When determining in operation S370 that the temperature $T_m$ of the memory 300 is higher than the throttling temperature $T_{th}$, the control logic 330 may output a busy signal (e.g., may set the ready and busy signal RnB to a low level) and does not perform the command operation according to the command CMD (operation S372).

Then, the control logic 330 may receive the temperature $T_m$ of the memory 300 from the memory temperature sensor 320 at the regular intervals (operation S374).

Then, the control logic 330 may determine whether the temperature $T_m$ of the memory 300 is lower than or equal to the throttling temperature $T_{th}$ (operation S376).

When determining that the temperature $T_m$ of the memory 300 is lower than or equal to the throttling temperature $T_{th}$, the control logic 330 may output a busy signal and perform the command operation according to the command CMD (operation S380).

Alternatively, when determining in operation S376 that the temperature $T_m$ of the memory 300 is higher than the throttling temperature $T_{th}$, the control logic 330 may return to operation S374 and receive the temperature $T_m$ of the memory 300 at the regular intervals.

The storage device 20 according to exemplary embodiments may determine whether to perform a command operation based on the temperature $T_m$ of the memory 300 by using the control logic 330 without intervention of the memory controller 200. Therefore, since communication between the memory controller 200 and the control logic 330 does not occur, an unnecessary amount of heat generated and an unnecessary amount of power consumed by the storage device 20 can be prevented.

Figure 10:
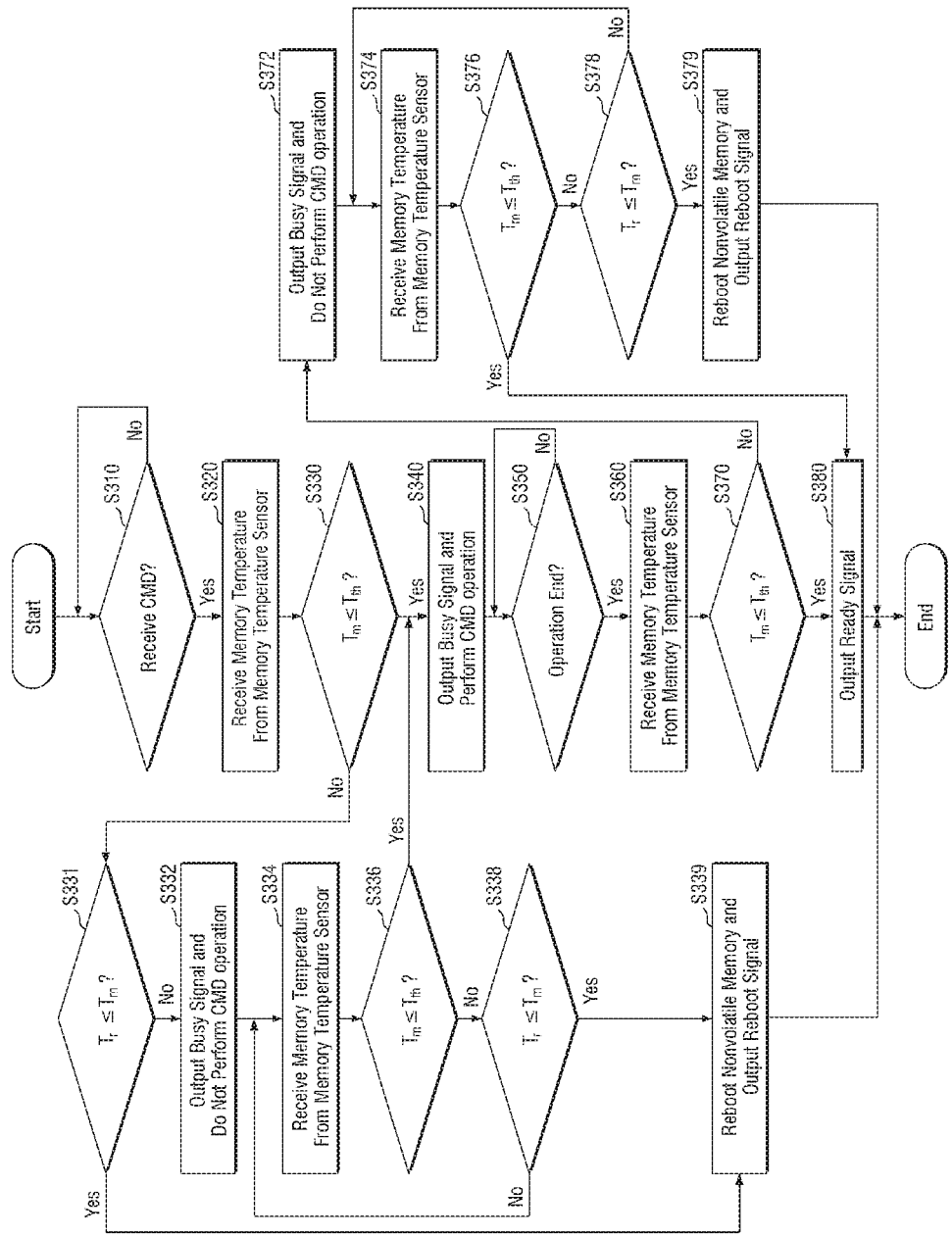
FIG. 10 is a flowchart illustrating the operation of a storage device in a thermal throttling mode according to exemplary embodiments.

FIG. 10 is a flowchart illustrating the operation of the storage device 20 in the thermal throttling mode according to exemplary embodiments. For convenience of explanation, the following description will focus on differences between FIGS. 9 and 10.

Referring to FIGS. 1 and 10, when the control logic 330 determines in operation S330 that the temperature $T_m$ of the memory 300 is higher than the throttling temperature $T_{th}$, it may further determine whether the temperature $T_m$ of the memory 300 is lower than the reboot temperature $T_r$ (operation S331). When the control logic 330 determines in operation S331 that the temperature $T_m$ of the memory 300 is higher than or equal to the reboot temperature $T_r$, the control logic 330 may reboot the memory 300 and output the reboot signal Reboot (operation S339). That is, when determining that the temperature $T_m$ of the memory 300 is higher than or equal to the reboot temperature $T_r$, the control logic 330 may forcibly reboot the memory 300 to protect the memory 300. Therefore, the memory controller 200 may receive the reboot signal Reboot in response to a command CMD. Alternatively, when determining in operation S331 that the temperature $T_m$ of the memory 300 is lower than the reboot temperature $T_r$, the control logic 330 may output a busy signal and does not perform a command operation according to the command CMD (operation S332).

In addition, when the control logic 330 determines in operation S336 that the temperature $T_m$ of the memory 300 is higher than the throttling temperature $T_{th}$, the control logic 330 may further determine whether the temperature $T_m$ of the memory 300 is lower than the reboot temperature $T_r$ (operation S338). When determining that the temperature $T_m$ of the memory 300 is lower than the reboot temperature $T_r$, the control logic 330 may return to operation S334 and measure the temperature $T_m$ of the memory 300 at regular intervals. Alternatively, when the control logic 330 determines in operation S338 that the temperature $T_m$ of the memory 300 is higher than or equal to the reboot temperature $T_r$, the control logic 330 may reboot the memory 300 and output the reboot signal Reboot (operation S339).

In addition, when the control logic 330 determines in operation S376 that the temperature $T_m$ of the memory 300 is higher than the throttling temperature $T_{th}$, the control logic 330 may further determine whether the temperature $T_m$ of the memory 300 is lower than the reboot temperature $T_r$ (operation S378). When determining that the temperature $T_m$ of the memory 300 is lower than the reboot temperature $T_r$, the control logic 330 may return to operation S374 and receive the temperature $T_m$ of the memory 300 at the regular intervals. Alternatively, when the control logic 330 determines in operation S378 that the temperature $T_m$ of the memory 300 is higher than or equal to the reboot temperature Tr, the control logic 330 may reboot the memory 300 and output the reboot signal Reboot (operation S379). That is, the memory controller 200 may receive the reboot signal Reboot in response to the command CMD.

Figure 11:
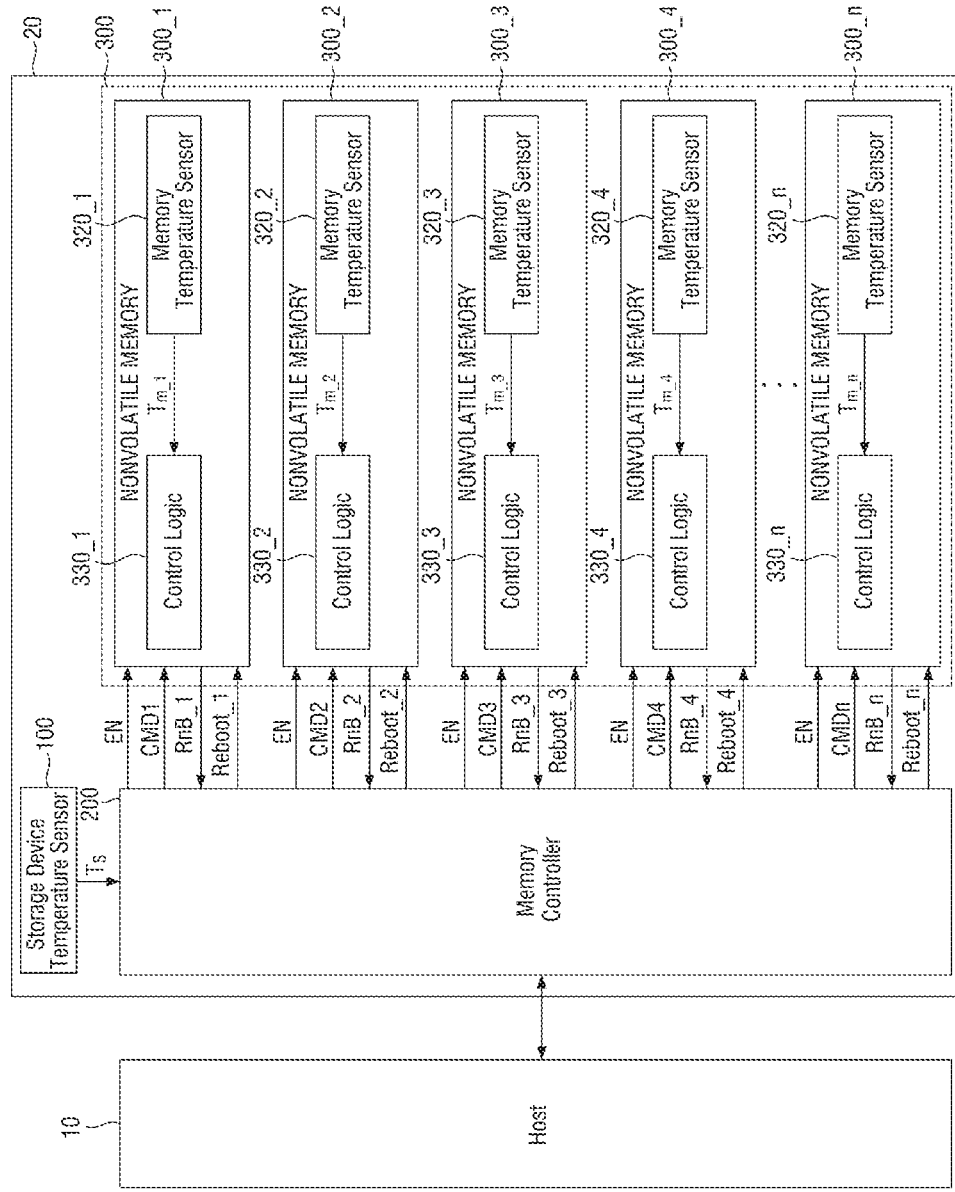
FIG. 11 is a block diagram of a storage device according to exemplary embodiments.

FIG. 11 is a block diagram of the storage device 20 according to exemplary embodiments. For convenience of explanation, the following description will focus on differences between the storage device 20 of FIG. 1 and the storage device 20 of FIG. 11.

Referring to FIG. 11, the storage device 20 according to exemplary embodiments may include first through $n^{th}$ memories 300_1 through 300_n, where n is a natural number. A memory controller 200 may receive the temperature $T_s$ of the storage device 20 from the storage device temperature sensor 100. The memory controller 200 may provide the enable signal EN to each of the first through $n^{th}$ memories 300_1 through 300_n according to the temperature $T_s$ of the storage device 20 received from the storage device temperature sensor 100.

The memory controller 200 may transmit first through $n^{th}$ commands CMD1 through CMDn respectively to the first through $n^{th}$ memories 300_1 through 300_n at the request of the host 10.

Each of the first through $n^{th}$ memories 300_1 through 300_n may include each of first through $n^{th}$ control logics 330_1 through 330_n and each of first through $n^{th}$ memory temperature sensors 320_1 through 320_n. Each of the first through $n^{th}$ memories 300_1 through 300_n may receive each of first through $n^{th}$ temperatures $T_{m\_1}$ through $T_{m\_n}$ of the first through $n^{th}$ memories 300_1 through 300_n from each of the first through $n^{th}$ memory temperature sensors 320_1 through 320_n in response to the first through $n^{th}$ commands CMD1 through CMDn, respectively, and may perform a command operation.

The first through $n^{th}$ memories 300_1 through 300_n may perform a command operation at different times, and may respectively output ready and busy signals RnB_1 through RnB_n. The first through $n^{th}$ memories 300_1 through 300_n may respectively receive reboot signals Reboot_1 through Reboot_n from the memory controller 200.

The storage device 20 according to exemplary embodiments does not simultaneously determine whether to perform a command operation on memories according to the temperature of the storage device 20. Therefore, the efficiency of the storage device 20 can be improved.

Figure 12:
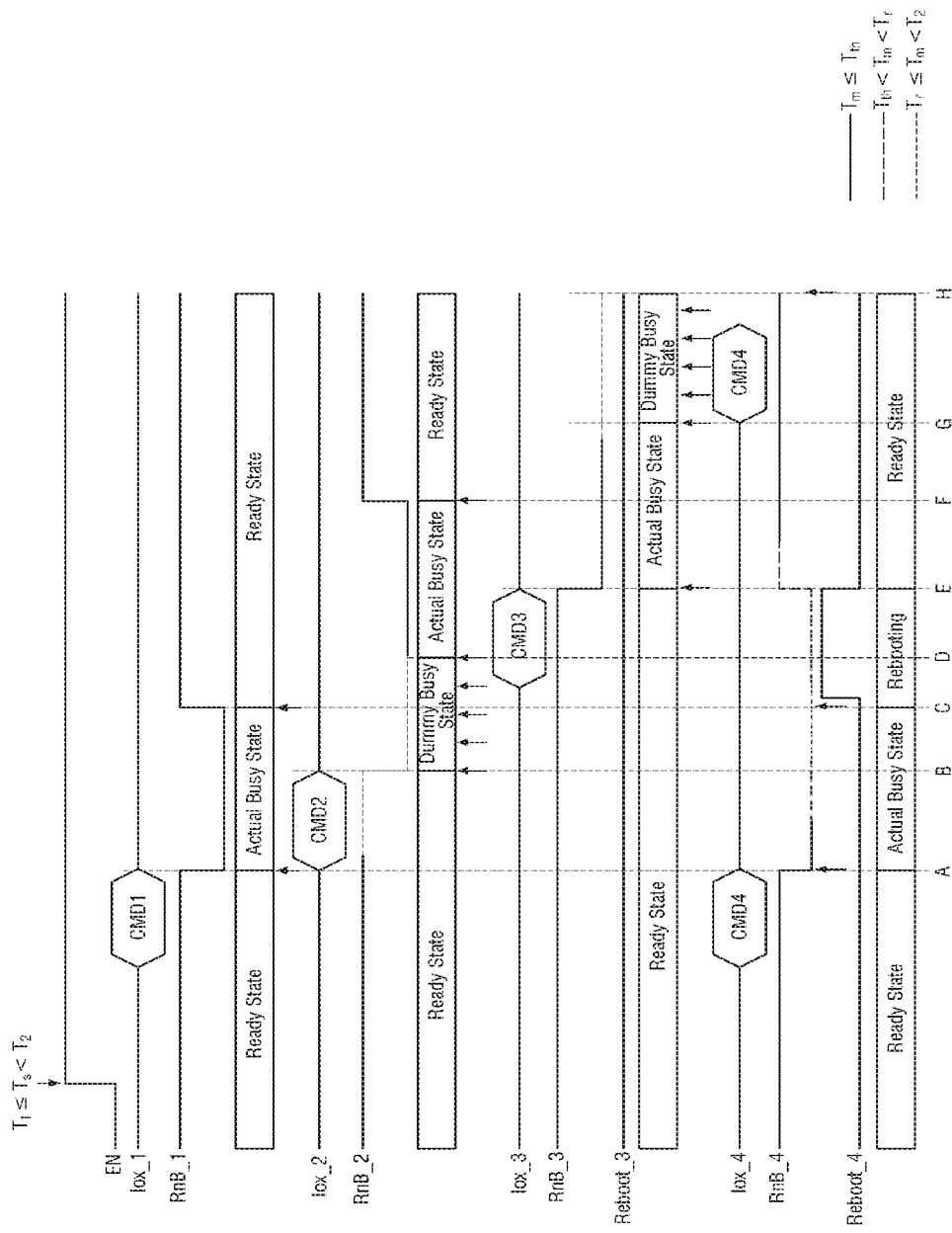
FIG. 12 illustrates the operation of the storage device according to the exemplary embodiments of FIG. 11 at random times.

FIG. 12 illustrates the operation of the storage device 20 according to the exemplary embodiments of FIG. 11 at random times. Here, a solid ready and busy signal line RnB_1 through RnB_4 indicates a case in which the temperature $T_m$ of the memory 300 is lower than or equal to the throttling temperature $T_{th}$, a broken ready and busy signal line RnB_1 through RnB_4 indicates a case in which the temperature $T_m$ of the memory 300 is higher than the throttling temperature $T_{th}$ and lower than the reboot temperature $T_r$, and a dotted ready and busy signal line RnB_1 through RnB_4, which is smaller than the broken ready and busy signal line RnB_1 through RnB_4, indicates a case in which the temperature $T_m$ of the memory 300 is higher than or equal to the reboot temperature $T_r$ and lower than the second set temperature $T_2$. In addition, an upward arrow indicates a case in which the temperature $T_m$ of the memory 300 is determined. For ease of description, the first memory 300_1, the second memory 300_2, the third memory 300_3, and the fourth memory 300_4 will be mainly described below.

Referring to FIGS. 11 and 12, the first through fourth memories 300_1 through 300_4 may receive the enable signal EN and operate in a thermal throttling mode.

In the thermal throttling mode, a time when the first memory 300_1 receives and performs a first command CMD1, a time when the second memory 300_2 receives and performs a second command CMD2, a time when the third memory 300_3 receives and performs a third command CMD3, and a time when the fourth memory 300_4 receives and performs a fourth command CMD4 may be different from each other. The first memory 300_1 may perform a first command operation at a time A, the second memory 300_2 may perform a second command operation at a time B, the third memory 300_3 may perform a third command operation at a time E, and the fourth memory 300_4 may perform a fourth command operation at the time A.

At a time B, a temperature $T_{m\_}1$, of the first memory 300_1 may be lower than a temperature $T_{m\_}2$ of the second memory 300_2. At the time B, both the first memory 300_1 and the second memory 300_2 may output a busy signal, but the first memory 300_1 may perform the first command CMD1, and the second memory 300_2 does not perform the second command CMD2.

In a section between B and C, the first memory 300_1 may perform the first command CMD1 and does not receive the temperature $T_{m\_}1$ of the first memory 300_1 from a first memory temperature sensor 320_1. In the section between B and C, the second memory 300_2 may receive the temperature $T_{m\_}2$ of the second memory 300_2 from a second memory temperature sensor 320_2 at regular intervals, and the third memory 300_3 does not receive a temperature $T_{m\_}3$ of the third memory 330_3 from a third memory temperature sensor 320_3. The temperature $T_{m\_}2$ of the second memory 300_2 received from the second memory temperature sensor 320_2 may be higher than the temperature $T_{m\_}3$ of the third memory 300_3 received from the third memory temperature sensor 320_3. That is, the first memory 300_1 may be in an actual busy state, the second memory 300_2 may be in a dummy busy state, and the third memory 300_3 may be in a ready state.

While the fourth memory 300_4 performs the fourth command operation, a temperature $T_{m\_}4$ of the fourth memory 300_4 may become higher than or equal to the reboot temperature $T_r$. The fourth memory 300_4 may be rebooted if the temperature $T_{m\_}4$ of the fourth memory 300_4 received from a fourth memory temperature sensor 320_4 at a time C when the fourth command operation is finished is higher than or equal to the reboot temperature $T_r$. The fourth memory 300_4 may output a reboot signal Reboot_4. That is, the memory controller 200 may receive the reboot signal Reboot_4 in response to the fourth command CMD4 from the fourth memory 300_4. Subsequently, the fourth memory 300_4 may receive another fourth command CMD4 from the memory controller 200.

Although the first command CMD1, the second command CMD2, the third command CMD3 and the fourth command CMD4 are output at different times in FIG. 12, exemplary embodiments are not limited to this case, and some commands may also be output at the same time.

In FIG. 12, the indicators _1, _2, etc. are used to denote previously described elements (e.g., I/O line I/Ox, ready and busy signal RnB, reboot signal Reboot) in a manner corresponding with the first through fourth memories 300_1 through 300_4.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A storage device, comprising:
    a memory;
    a memory controller which transmits a command to the memory; and
    a storage device temperature sensor which measures a temperature of the storage device,
    wherein the memory comprises:
        at least one memory cell array;
        a memory temperature sensor which measures a temperature of the memory and is different from the storage device temperature sensor; and
        a control logic which outputs a busy signal or a ready signal in response to the command,
    wherein
        while operating in a thermal throttling mode, the control logic receives the temperature of the memory from the memory temperature sensor in response to the control logic receiving the command, determines whether the temperature of the memory is lower than or equal to a throttling temperature at a time when the command is provided to the memory, and performs a command operation according to the command on the memory cell array when the temperature of the memory is lower than or equal to the throttling temperature, and
        while not operating in the thermal throttling mode, the control logic does not receive the temperature of the memory from the memory temperature sensor and perform the command operation according to the command on the memory cell array regardless of the temperature of the memory.

2. The storage device of claim 1, wherein the control logic reboots the memory when the temperature of the memory is higher than or equal to a reboot temperature and outputs a reboot signal in response to the command, and the reboot temperature is higher than the throttling temperature.

3. The storage device of claim 1, wherein the control logic receives the temperature of the memory from the memory temperature sensor at regular intervals when the temperature of the memory is higher than the throttling temperature, and performs the command operation according to the command on the memory cell array when the temperature of the memory received from the memory temperature sensor is lower than or equal to the throttling temperature.

4. The storage device of claim 1, wherein the control logic receives the temperature of the memory from the memory temperature sensor when the command operation according to the command performed on the memory cell array ends.

5. The storage device of claim 4, wherein the control logic outputs the ready signal when the temperature of the memory received from the memory temperature sensor after the end of the command operation according to the command performed on the memory cell array is lower than or equal to the throttling temperature, and outputs the busy signal when the temperature of the memory received from the memory temperature sensor after the end of the command operation according to the command performed on the memory cell array is higher than the throttling temperature.

6. The storage device of claim 5, wherein the control logic reboots the memory and outputs a reboot signal in response to the command when the temperature of the memory received from the memory temperature sensor after the end of the command operation according to the command performed on the memory cell array is higher than or equal to a reboot temperature, and the reboot temperature is higher than the throttling temperature.

7. The storage device of claim 4, wherein the control logic receives the temperature of the memory at regular intervals when the temperature of the memory received from the memory temperature sensor after the end of the command operation according to the command performed on the memory cell array is higher than the throttling temperature.

8. The storage device of claim 1,
    wherein the memory controller provides an enable signal to the memory when the temperature of the storage device received from the storage device temperature sensor is higher than or equal to a first set temperature, and the memory operates in the thermal throttling mode in response to the enable signal being provided, and
    wherein the throttling temperature is higher than the first set temperature.

9. The storage device of claim 1, wherein the memory temperature sensor does not measure the temperature of the memory while the control logic performs the command operation according to the command on the memory cell array, and measures the temperature of the memory while the control logic does not perform the command operation according to the command on the memory cell array.

10. The storage device of claim 1, wherein while performing the command operation according to the command on the memory cell array, the control logic does not receive the temperature of the memory.

11. A storage device, comprising:
    a storage device temperature sensor which measures a temperature of the storage device;
    a memory controller which receives the temperature of the storage device from the storage device temperature sensor, and generates an enable signal when the received temperature of the storage device is higher than or equal to a first set temperature; and a first memory and a second memory, each of which operates in a thermal throttling mode in response to the enable signal received from the memory controller, wherein the first memory, while operating in the thermal throttling mode, receives a temperature of the first memory from a first memory temperature sensor disposed in the first memory in response to the first memory receiving a first command received from the memory controller, determines whether the received temperature of the first memory is lower than or equal to a throttling temperature at a first time when the first command is received by the first memory, and performs the first command when the temperature of the first memory is lower than or equal to the throttling temperature, the first memory, while not operating in the thermal throttling mode, does not receive the temperature of the first memory from the first memory temperature sensor and performs the first command regardless of the temperature of the first memory, the second memory, while operating in the thermal throttling mode, receives a temperature of the second memory from a second memory temperature sensor disposed in the second memory in response to the second memory receiving a second command received from the memory controller, determines whether the received temperature of the second memory is lower than or equal to the throttling temperature at a second time when the second command is received by the second memory, and performs the second command when the received temperature of the second memory is lower than or equal to the throttling temperature, the second memory, while not operating in the thermal throttling mode, does not receive the temperature of the second memory from the second memory temperature sensor and performs the second command regardless of the temperature of the second memory, and a time when the first command is performed by the first memory is different from a time when the second command is performed by the second memory.

12. The storage device of claim 11, wherein the memory controller periodically receives the measured temperature of the storage device from the storage device temperature sensor and stops providing the first and second commands to the first and second memories when the temperature of the storage device is higher than a second set temperature, and the second set temperature is higher than the first set temperature.

13. The storage device of claim 11, wherein at the time when the first command is performed by the first memory, both the first memory and the second memory output a busy signal, the first memory performs the first command, and the second memory does not perform the second command.

14. The storage device of claim 13, wherein at the time when the first command is performed by the first memory, the temperature of the second memory received from the second memory temperature sensor is higher than the temperature of the first memory received from the first memory temperature sensor.

15. The storage device of claim 11, further comprising:
a third memory which operates in the thermal throttling mode in response to the enable signal received from the memory controller, wherein while operating in the thermal throttling mode, the third memory receives a temperature of the third memory from a third memory temperature sensor disposed in the third memory in response to the third memory receiving a third command received from the memory controller, and determines whether to perform the third command according to the received temperature of the third memory, and the time when the first command is performed by the first memory, the time when the second command is performed by the second memory, and a time when the third command is performed by the third memory are different from each other.

16. The storage device of claim 15, wherein
the first memory comprises a first control logic, the second memory comprises a second control logic, and the third memory comprises a third control logic, and
while the first memory performs the first command, the first control logic does not receive the temperature of the first memory from the first memory temperature sensor, the second control logic receives the temperature of the second memory from the second memory temperature sensor at regular intervals, and the third control logic does not receive the temperature of the third memory from the third memory temperature sensor.

17. The storage device of claim 16, wherein the temperature of the second memory received from the second memory temperature sensor is different from the temperature of the third memory received from the third memory temperature sensor.

18. A method of controlling a storage device, the method comprising:
measuring a temperature of the storage device using a storage device temperature sensor disposed in the storage device;
generating an enable signal when the temperature of the storage device is higher than a first set temperature;
while the enable signal is provided so that the memory operates in a thermal throttling mode, measuring a temperature of the memory using a memory temperature sensor disposed in the memory in response to the memory receiving a command,
determining whether the measured temperature of the memory is lower than or equal to a throttling temperature at a time when the command is received by the memory, and
performing the command operation according to the command on the memory when the measured temperature of the memory is lower than or equal to the throttling temperature, and
while the enable signal is not provided so that the memory does not operate in the thermal throttling mode, does not measuring the temperature of the memory using the memory temperature sensor, and performing the command operation according to the command on the memory regardless of the temperature of the memory.

19. The method of claim 18, wherein the temperature of the memory is measured by the memory temperature sensor after an end of the command operation according to the command performed on the memory, a busy signal is output when the measured temperature of the memory is higher than the throttling temperature, and a ready signal is output when the measured temperature of the memory is lower than or equal to the throttling temperature.

20. The storage device of claim 18, wherein while performing the command operation according to the command on the memory, does not measuring the temperature of the memory using the memory temperature sensor.

* * * * *